United States Patent Office 2,865,949
Patented Dec. 23, 1958

2,865,949

O,O-DIALKYL S-(1,2-DISUBSTITUTED HYDRAZINO) PHOSPHOROTHIOLOTHIONATES

Richard L. McConnell and Harry W. Coover, Jr., Kingsport, Tenn., assignors to Eastman Kodak Company, Rochester, N. Y., a corporation of New Jersey No Drawing. Application February 6, 1957
Serial No. 638,450

12 Claims. (Cl. 260—461)

This invention relates to new organophosphorus compounds and to a method for producing those compounds.

The organophosphorus compounds within the scope of this invention have the structural formula:

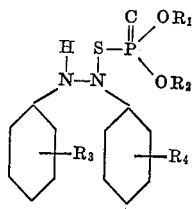

wherein $R_1$ and $R_2$ are lower alkyl radicals containing from 1 to 4 carbon atoms and $R_3$ and $R_4$ are selected from the group consisting of hydrogen, nitro, hydroxy, alkyl radicals having 1 to 4 carbon atoms, halogen, amino, alkoxy containing 1 to 4 carbon atoms, phenyl and amido radicals having the formula $$-\underset{H}{N}-\underset{O}{\overset{\|}{C}}-R$$

wherein R is an alkyl radical containing 1 to 4 carbon atoms.

The compounds within the scope of this invention are prepared by reacting a dialkyl phosphorothiolothionate with an azo compound wherein a substituted or unsubstituted phenyl radical is attached to each of the nitrogen atoms. The reaction can be illustrated by the following equation wherein the azo compound is azobenzene:

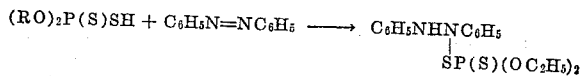

The dialkyl phosphorothiolothionates that are employed to produce the compounds of this invention have the structural formula:

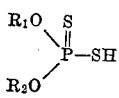

wherein $R_1$ and $R_2$ are as described above. The azo compounds that are used in this invention have the structural formula:

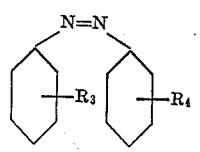

wherein $R_3$ and $R_4$ are as described above.

The dialkyl phosphorothiolothionates that are employed in practicing this invention are readily prepared by the reaction of phosphorus pentasulfide, $P_2S_5$, with the appropriate aliphatic alcohol. The azo compounds that are employed in practicing this invention can be prepared by the reduction of an aromatic nitro compound in an alkaline medium as represented by the following equation:

$$2C_6H_5NO_2 + 4Zn + 8NaOH \rightarrow$$
$$C_6H_5N=NC_6H_5 + 4Na_2ZnO_2 + 4H_2O$$

Alternatively, the azo compounds can be prepared by the reaction of a suitable nitroso compound with aniline or an aniline derivative.

To prepare the compounds of this invention, the reaction between the dialkyl phosphorothiolothionate and the azo compound can be carried out by the portion-wise addition of the azo compound to the dialkyl phosphorothiolothionate. However, any order of addition of the reactants can be used. It is preferable to use equimolar quantities of the reactants, but, if desired, an excess of either of the reactants can be used. The temperature employed for carrying out the reaction is within the range of $-25$ to $150°$ C. and the preferred temperature range is 25 to $125°$ C. The reaction time is usually within a range of 1 to 8 hours. The reaction can be carried out in the absence of any catalyst, but in some instances, it is found desirable to employ a base catalyst such as a tertiary amine. Similarly, solvents are not necessary for carrying out the reaction, but, if desired, inert solvents such as normally liquid hydrocarbons, chlorinated hydrocarbons and ethers can be used.

Among the azo compounds that can be used to practice this invention are:

Azo benzene
4-dimethylamino azobenzene
4-nitroazobenzene
4,4′-dihydroxyazobenzene
2,2′-dimethylazobenzene
4,4′-dichloroazobenzene
4-acetamidoazobenzene
2-aminoazobenzene
3-aminoazobenzene
4-aminoazobenzene
4-amino-2,3′-dimethylazobenzene
4-amino-3,4′-dimethylazobenzene
4′-amino-2,3′-dimethylazobenzene
2,2′-diaminoazobenzene
2,4-diaminoazobenzene
4,4′-diaminoazobenzene
4,4′-diethoxyazobenzene
2,2′-dihydroxyazobenzene
4,4′-dimethylazobenzene
3,3′-dimethylazobenzene
4,4′-diphenylazobenzene
2-hydroxyazobenzene
3-hydroxyazobenzene
4-hydroxyazobenzene
3,3′-dichloroazobenzene
2,4-dichloroazobenzene
3,3′-dibromoazobenzene
4,4′-dibromoazobenzene
2,2′-dibromoazobenzene
2,4-dibromoazobenzene
3-chloroazobenzene
4-chloroazobenzene
3-bromoazobenzene
4-bromoazobenzene The following examples are illustrative of this invention:

*Example 1.—O,O - diethyl S-(1,2-diphenylhydrazino)-phosphorothiolothionate*

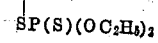

Azobenzene (0.05 mole) and diethyl phosphorothiolothionate (0.05 mole) were mixed and heated on the steam bath with stirring for 1 hour. The product is a viscous red oil, $n_D^{20}$ 1.6206. After standing for several days, it crystallized into large prisms.

*Example 2.—O,O - dimethyl S - [1 - (p-dimethylaminophenyl)-2-phenyl-1-hydrazino]phosphorothiolothionate*

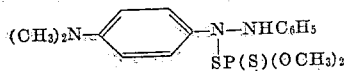

This compound was prepared from 4-dimethylaminoazobenzene (0.1 mole) and dimethyl phosphorothiolothionate (0.1 mole) according to the procedure of Example 1.

*Example 3.—O,O-diisopropyl S-[2-(p-nitrophenyl)-1-phenyl-1-hydrazino]phosphorothiolothionate*

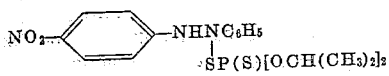

This compound was prepared from 4-nitroazobenzene (0.1 mole) and diisopropyl phosphorothiolothionate (0.1 mole) according to the procedure of Example 1.

*Example 4.—O,O-diethyl S-[1,2-bis(p-hydroxyphenyl)-hydrazino]phosphorothiolothionate*

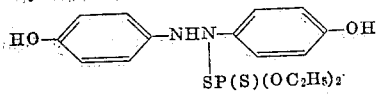

This compound was prepared from 4,4'-dihydroxyazobenzene (0.1 mole) and diethyl phosphorothiolothionate (0.1 mole) according to the procedure of Example 1.

*Example 5.—O,O-diethyl S-[1,2-bis(o-tolyl)hydrazino]-phosphorothiolothionate*

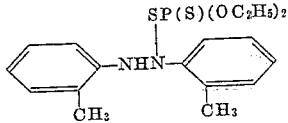

This compound was prepared from 2,2'-dimethylazobenzene (0.1 mole) and diethyl phosphorothiolothionate (0.1 mole) according to the procedure of Example 1.

*Example 6.—O,O-diethyl S-[1,2-bis(p-chlorophenyl)-hydrazino]phosphorothiolothionate*

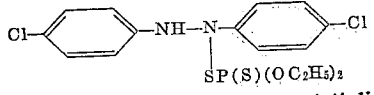

This compound was prepared from 4,4'-dichloroazobenzene (0.1 mole) and diethyl phosphorothiolothionate (0.1 mole) according to the procedure of Example 1.

*Example 7.—Utility*

Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on damp paper toweling in Petri dishes and observed after 24 hours for mortality among the adult mites.

TABLE 1

[Toxicant: O,O-diethyl S-(1,2-diphenylhydrazino) phosphorothiolothionate (Example 1).]

| Concentration in p. p. m.: | Percent kill mites |
|---|---|
| 1000 | 100 |
| 100 | 100 |
| 30 | 10 |
| 0 | 0 |

We claim:
1. The organophosphorus compounds having the structural formula:

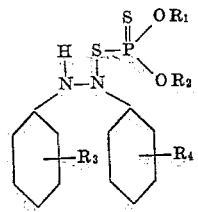

wherein $R_1$ and $R_2$ are lower alkyl radicals containing from 1 to 4 carbon atoms and $R_3$ and $R_4$ are selected from the group consisting of hydrogen, nitro, hydroxy, alkyl radicals having 1 to 4 carbon atoms, chlorine, bromine, amino, alkoxy containing 1 to 4 carbon atoms, phenyl and amido radicals having the formula $$\begin{matrix} H & O \\ | & \| \\ -N-C-R \end{matrix}$$

wherein R is an alkyl radical containing 1 to 4 carbon atoms.

2. O,O - diethyl S - (1,2 - diphenylhydrazino)phosphorothiolothionate having the formula:

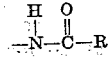

3. O,O-dimethyl S-[1(p-dimethylaminophenyl)-2-phenyl-1-hydrazino]phosphorothiolothionate having the formula:

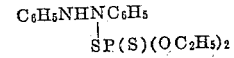

4. O,O - diisopropyl S - [2 - (p - nitrophenyl) - 1 - phenyl - 1 - hydrazino]phosphorothiolothionate having the formula:

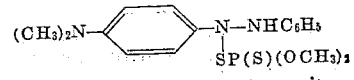

5. O,O - diethyl S - [1,2 - bis(o - tolyl)hydrazino]-phosphorothiolothionate having the formula:

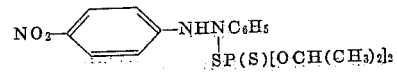

6. O,O - diethyl S - [1,2 - bis(p - chlorophenyl)hydrazino]phosphorothiolothionate having the formula:

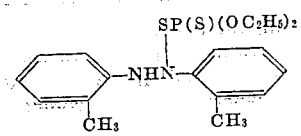

7. The method for producing organophosphorus compounds which comprises reacting a dialkyl phosphorothiolothionate having the structural formula:

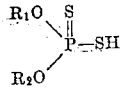

wherein $R_1$ and $R_2$ are lower alkyl radicals containing 1 to 4 carbon atoms with an azo compound having the structural formula:

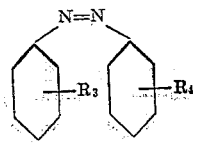

wherein $R_3$ and $R_4$ are selected from the group consisting of hydrogen, nitro, hydroxy, alkyl radicals having 1 to 4 carbon atoms, chlorine, bromine, amino, alkoxy containing 1 to 4 carbon atoms, phenyl and amido radicals having the formula

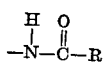

wherein R is an alkyl radical containing 1 to 4 carbon atoms at a temperature within the range of —25 to 150° C.

8. The method for producing O,O-diethyl S-(1,2-diphenylhydrazino)phosphorothiolothionate which comprises reacting diethyl phosphorothiolothionate with azobenzene at a temperature within the range of —25 to 150° C.

9. The method for producing O,O-dimethyl S-[1-(p-dimethylaminophenyl) - 2 - phenyl - 1 - hydrazino]phosphorothiolothionate which comprises reacting dimethyl phosphorothiolothionate with 4-dimethylaminoazobenzene at a temperature within the range of —25 to 150° C.

10. The method for producing O,O-diisopropyl S-[2-(p - nitrophenyl) - 1 - phenyl - 1 - hydrazino]phosphorothiolothionate which comprises reacting diisopropyl phosphorothiolothionate with 4-nitroazobenzene at a temperature within the range of —25 to 150° C.

11. The method for producing O,O-diethyl S-[1,2-bis-(o - tolyl)hydrazino]phosphorothiolothionate which comprises reacting diethyl phosphorothiolothionate with 2,2'-dimethylazobenzene at a temperature within the range of —25 to 150° C.

12. The method for producing O,O-diethyl S-[1,2-bis-(p - chlorophenyl)hydrazino]phosphorothiolothionate which comprises reacting diethyl phosphorothiolothionate with 4,4'-dichloroazobenzene at a temperature within the range of —25 to 150° C.

No references cited.